United States Patent [19]

Rauhut et al.

[11] 3,816,325

[45] June 11, 1974

[54] CHEMICAL LIGHTING SYSTEM COMPRISING A POLYMERIC CHEMILUMINESCENT COMPOSITION AND AN ACTIVATING LIQUID COMPRISING HYDROGEN PEROXIDE

[75] Inventors: Michael McKay Rauhut, Norwalk; Andrew Milo Semsel, Ridgefield, both of Conn.

[73] Assignee: American Cyanamid Company, Stamford, Conn.

[22] Filed: May 8, 1972

[21] Appl. No.: 251,509

Related U.S. Application Data

[63] Continuation of Ser. No. 28,971, April 15, 1970, abandoned.

[52] U.S. Cl. ....... 252/188.3 CL, 252/186, 240/2.25
[51] Int. Cl. ............................................. G09k 3/00

[58] Field of Search .......................... 252/188.3, 186

[56] References Cited

UNITED STATES PATENTS 3,239,406   3/1966   Coffman et al. ................. 252/188.3

OTHER PUBLICATIONS

Rauhut et al. J. Am. Chem. Soc. 89:25 (Dec. 1967) pages 6515–6526.

*Primary Examiner*—John D. Welsh
*Attorney, Agent, or Firm*—Charles J. Fickey

[57] ABSTRACT

This invention relates to a new chemiluminescent light system. It more particularly relates to such a system where the chemiluminescent material is incorporated in a swellable polymeric composition.

7 Claims, No Drawings

CHEMICAL LIGHTING SYSTEM COMPRISING A POLYMERIC CHEMILUMINESCENT COMPOSITION AND AN ACTIVATING LIQUID COMPRISING HYDROGEN PEROXIDE

This application is a continuation of Ser. No. 28,971, filed Apr. 15, 1970 now abandoned, which was a continuation-in-part of prior application Ser. No. 741,517, filed July 1, 1968.

The present invention relates to a novel system for the direct generation of light from chemical energy to provide chemiluminescent light. By "light" as referred to herein is meant electromagnetic radiation at wavelengths falling between about 350 m$\mu$ and 1,000 m$\mu$.

The art of generating light from chemical energy, i.e., chemiluminescence, is continually in search of compositions which when reacted substantially improve the intensity and lifetime of light emission as contrasted to known chemiluminescent compositions and reactions. Obviously, improved compositions are constantly in demand for use as signal devices, for area illumination, etc.

A number of compositions have been proposed, based on the reaction of derivatives of oxalic acid with a peroxide in a solvent in the presence of a fluorescer. Such compositions have generally been in fluid form or gel form, requiring special handling techniques both during storage and use.

It is an object of this invention to obtain a chemiluminescent composition and a process employing said composition whereby a high efficiency may be obtained in the conversion of chemical energy into light.

Another object is to obtain a chemiluminescent compound which produces light over an extended period of time.

Another object of this invention is to obtain a chemiluminescent composition which attains light of high intensity.

Another object of this invention is to obtain a chemiluminescent composition which may be employed to obtain light by a process which is mechanically simple and which is economically inexpensive.

Another object of this invention is to obtain a chemiluminescent reactant which is stable over a long period of time and which may be subsequently reacted to obtain chemiluminescent light.

Another object of this invention is to obtain a chemiluminescent reactant comprising a swellable polymeric composition having incorporated therein a chemiluminescent compound which when reacted with an actuator component containing hydrogen peroxide will obtain chemiluminescent light by a process which is not hazardous.

The term "chemiluminescent reactant", as used herein, means (1) a mixture which will result in a chemiluminescent reaction when reacted with other necessary reactants in the processes as disclosed herein.

The term "fluorescent compound", as used herein, means a compound which fluoresces in a chemiluminescent reaction, or a compound which produces a fluorescent compound in a chemiluminescent reaction.

The term "chemiluminescent composition", as used herein, means a mixture which incorporates all necessary ingredients required for chemiluminescence.

The term "admixing", as used herein, means "reacting" or sufficiently bringing together component reactants to obtain a chemiluminescent reaction.

The term "diluent", as used herein, means a solvent or a vehicle which when employed with a solvent does not cause insolubility.

The term "hydrogen peroxide compound", as used herein, also includes compounds which upon reaction produce the hydrogen peroxide group.

The term "oxalyl-type" refers to a compound having at least two consecutive (adjacent) carbonyl groups.

The present invention is a novel chemical lighting system comprising:

1. A novel polymeric composition comprising a chemiluminescent material and a thermoplastic or solvent-swellable cross-linked polymer wherein said chemiluminescent material and said polymer are intimately mixed so as to provide substantial homogeneity, and 2. An activating liquid comprising hydrogen peroxide.

A fluorescent compound must additionally either (1) be included in either the polymeric or hydrogen peroxide component or (2) be produced as a product of reaction between hydrogen peroxide and the chemiluminescent material. The system is used to generate light by contacting the polymeric composition with the activating hydrogen peroxide liquid.

In a preferred modification the polymeric composition also includes a fluorescer of the type disclosed in application Ser. No. 491,896, abandoned Mar. 1, 1967, copending application Ser. No. 577,596, filed Sept. 7, 1966, and copending application Ser. No. 614,401, filed Feb. 7, 1967 (where the chemiluminescent material is an oxalic-type acid derivative, it is essential that such a fluorescer be included in either the polymeric or hydrogen peroxide component.) The polymeric composition may be plasticized (e.q. poly(vinyl chloride) plasticized with ethyl benzoate or dioctyl phthalate) or may be unplasticized (e.g., polyethylene). Ordinarily the preferred polymeric composition will be essentially free of heavy metals (iron, copper, nickel, etc.) basic and hydroxylic contaminants and free of opaque filler material which would absorb the emitted light.

The present invention has the following advantages:

A. The system of this invention can be formulated so as to be essentially dry after activation and thus eliminate spillage risk.

B. The system is relatively immune to adverse environmental conditions such as water, base and acid.

C. The system will not be adsorbed into porous or absorbent surfaces.

D. The system can be powdered or prilled for easy dispersal or can be molded into specific shapes (panels, tapes, bottles, tubes, etc.).

The hydrogen peroxide employed in the compositions and process of this invention may be obtained from any suitable hydrogen peroxide compound. For example, the hydrogen peroxide may be employed as sodium peroxide. Alternatively, sodium perborate may be placed in aqueous solution whereby a solution of hydrogen peroxide is obtained. Obviously, hydrogen peroxide or its solution may be employed. The peroxide employed may be obtained from anhydrous hydrogen peroxide compounds such as perhydrate of urea (urea peroxide), perhydrate or pyrophosphate (sodium pyrophosphate peroxide), perhydrate of histidine (histidine peroxide), sodium perborate, and the like. Still another form in which the $H_2O_2$ may be provided in the composition is that of an anhydrous solution of $H_2O_2$ in a suitable solvent such as an ether, an ester, an aromatic hydrocarbon, etc. of the type which would provide a suitable diluent for the composition of this invention. Whenever hydrogen peroxide is contemplated to be employed, any suitable compound may be substituted which will produce hydrogen peroxide.

The hydrogen peroxide concentration may range from about 15 molar down to about $10^{-5}$, preferably about 2 molar down to about $10^{-3}$ molar.

Typical diluents within the purview of the instant discovery are those that do not readily react with a peroxide such as hydrogen peroxide, and which do not readily react with the chemiluminescent compound.

The following are illustrative of the diluents or solvents which may be employed: Non-cyclic or cyclic ethers, such as diethyl ether, diamyl ether, diphenyl ether, anisole, tetrahydrofuran, dioxane, and the like; esters such as ethyl acetate, propyl formate, amyl acetate, dimethyl phthalate, diethyl phthalate, methyl benzoate, and the like; aromatic hydrocarbons, such as benzene, xylene, toluene, and the like.

The fluorescent compounds contemplated herein are numerous; and they may be defined broadly as those which do not readily react on contact with the peroxide employed in this invention, such as hydrogen peroxide; likewise, they do not readily react on contact with the ester of oxalic acid. Typical suitable fluorescent compounds for use in the present invention are those which have a spectral emission falling between 330 millimicrons and 1000 millimicrons and which are at least partially soluble in any of the above diluents, if such diluent is employed. Among these are the conjugated polycyclic aromatic compounds having at least 3 fused rings, such as: anthracene, substituted anthracene, benzanthracene, phenanthrene, substituted phenanthrene, naphthacene, substituted napthacene, pentacene, substituted pentacene, and the like. Typical substituents for all of these are phenyl, lower alkyl, chloro, bromo, cyano, alkoxy ($C_1$–$C_{16}$), and other like substituents which do not interfere with the light-generating reaction contemplated herein.

Numerous other fluorescent compounds having the properties given hereinabove are well known in the art. Many of these are fully described in "Fluorescence and Phosphorescence", by Peter Pringsheim, Interscience Publishers, Inc. New York, N.Y., 1949. Other fluorescers are described in "The Colour Index", Second Edition, Volume 2, The American Association of Textile Chemists and Colorists, 1956, pp. 2907-2923. While only typical fluorescent compounds are listed hereinabove, the person skilled in the art is fully aware of the fact that this invention is not so restricted and that numerous other fluorescent compounds having similar properties are contemplated for use herein. The preferred fluorescent is 9,10-bis (phenylethynyl) anthrocene.

It should be noted, however, that although a fluorescent compound is necessary to obtain the production of light, the fluorescent compound is not necessary to obtain a chemical reaction and chemical energy release. Also, a fluorescent chemiluminescent compound such as phthalimido 3,6,6-trisulfo-2-naphtyl oxalate does not require a separate fluorescent compound to obtain light. Thus, a reactant including a fluorescent O-acylhydroxylamine would thereby "include at least one fluorescent compound."

It has been found that the molar (miles per liter of diluent) concentrations of the major components of the novel composition herein described may vary considerably. It is only necessary that components be in sufficient concentration to obtain chemiluminescence. The chemiluminescent compound molar concentration normally is in the range of at least about $10^{-7}$ to 5 molar, preferably in the range of at least about $10^{-4}$ to about 1 molar; the fluorescent compound is present in the range from about $10^{-5}$ to 5 molar, preferably $10^{-4}$ to $10^{-1}$ molar; and the diluent must be present in a sufficient amount to form at least a partial solution of the reactants involved in the chemiluminescent reaction.

A large variety of polymers may be employed in the polymeric composition: polyethylene, polypropylene, poly(vinyl chloride), poly(methyl methacrylate), poly(vinyl benzoate), poly(vinyl acetate), cellulose poly(vinyl pyrrolidinone), polyacrylamide, epoxys, silicones, poly(vinyl butyral), polyurethane, nylons, polyacetal, polycarbonate, polyesters and polyethers are non-limiting examples. Cross-linked polymers may also be employed, such as polystyrene-poly(divinyl benzene), polyacrylamide-poly(methylenebisacrylamide), polybutadiene-copolymers, and the like. For most applications the polymer should be selected in conjunction with the activating hydrogen peroxide liquid so as to be dissolvable, swellable, or otherwise permeable to said activating liquid. Such permeability is normally desired to permit efficient contact between the activating liquid, the chemiluminescent material, and (when desired or necessary) the fluorescer. It will often be desirable to select the polymer and activating liquid so as to provide a particular diffusion rate and thus control the intensity and duration of light emission. Some useful polymer-solvent combination are: 1) poly(vinyl pyrrolidinone)-water, 2) poly(vinyl styrene-polydivinyl benzene) copolymer-ethylbenzene, 3) poly(vinyl chloride-ethyl benzoate), 4) poly(methyl methacrylatedimethyl phthalate). The permeability of polymers to solvents is, of course, well known to the art and it is a straightforward matter to select useful polymer-solvent combinations. Solvents used as plasticizers are particularly advantageous. It is not necessary for either the chemiluminescent material or a fluorescer to be soluble in the polymer itself, although where the polymer does not itself provide solubility for both these ingredients, the activating liquid should provide at least partial solubility. Alternatively the polymer could be plasticized with a solubilizing plasticizer.

A large variety of chemiluminescent materials may be employed in the polymeric composition of this invention. It is necessary only that the chemiluminescent material generate light when reacted with hydrogen peroxide and any necessary additional reactants. Active chemiluminescent materials include 3-aminophthalhydrazide, ("luminol") biacridinium salts ("lucigenin"), triphenylimidazole ("lophine"), and 9-chlorocarbonyl-10-methyl-acridinum chloride ("rosigenin"). None of the above examples require an added fluorescent material, although an added fluorescer may be advantageously employed to change the color of emitted light or to increase the luminousity. Such chemiluminescent materials and many others are well described in the literature, and the necessary conditions to achieve satisfactory light outputs on reaction with hydrogen peroxide and, sometimes, other reactants are well known. (K. D. Gundermann, Angew. Chem. Intern. Ed. Engl., 4, 566 (1965); E. J. Bowen, Pure and Applied Chem. 9, 473 (1964); F. McCapera, Quart. Revs., 20, 485 (1966). Other chemiluminescent materials belong to the peroxyoxalate class and are described in copending application Ser. No. 619,140, filed Feb. 28, 1967; application Ser. No. 547,761, filed May 5, 1966; application Ser. No. 547,782, refiled July 24, 1969, as continuation-in-part application Ser. No. 844,657; and in U.S. Pat. No. 3,399,137, issued Aug. 27, 1968; U.S. Pat. No. 3,400,080, issued Sept. 3, 1968; U.S. Pat. No. 3,442,815, issued May 6, 1969; Ser. No. 428,828, abandoned Feb. 8, 1968; refiled Sept. 13, 1967, issued May 6, 1969, as U.S. Pat. No. 3,442,813; U.S. Pat. No. 3,425,949, issued Feb. 4, 1969; U.S. Pat. No. 3,329,621, issued July 4, 1967 and U.S. Pat. No. 3,325,417, issued June 13, 1967. All of the peroxyoxalate chemiluminescent materials require that a fluorescer be included in either the polymer composition of this invention or in the activating hydrogen peroxide liquid. The preferred chemiluminescent material of this invention is selected from the group of aryl oxalates where the phenol component of the oxalate has an ionization constant in water more positive than $1.3 \times 10^{-10}$ (see application Ser. No. 619,140), e.g., bis(2,4,6-trichlorophenyl) oxylate, bis 2,4,5-trichloro-6-carbobutoxyphenyl oxylate, and the like.

The polymeric composition of the invention may be formed in a variety of ways. It may for example be 1) a finely divided powder, 2) large aggregates (B.B., pea, or larger sizes), 3) a molded shape such as a flat panel, bottle, sphere, tube, thin tape, etc. Molded shapes may be rigid and brittle or flexible depending on application requirements. The flexibility of the composition is determined by the choice of polymer and by addition of plasticizer, as well known in the art. Molded shapes may also be made elastomeric by selection of a rubber base (silicone for example).

For many applications it will be desirable to contain both the polymeric composition of this invention and the activating liquid in a single device providing means of storing the components without contact between them, means for admixing the components, and means for displaying the emitted light. Such devices have been described in copending application Ser. No. 741,517, filed July 1, 1968; application Ser. No. 667,116, filed Sept. 12, 1967; and application Ser. No. 674,296, filed Oct. 10, 1967, and refiled Nov. 7, 1968, as application Ser. No. 777,987. It should be noted that the polymeric composition of this invention offers advantage in such devices in that a rigid polymeric panel will maintain the shape of an otherwise floppy package and in that an absorbent polymer composition will absorb all free liquid after activation and thereby eliminate the danger of liquid spillage which might otherwise result from a broken package during use or prior to disposal of the spent system.

In other applications it will be desirable to keep the polymeric composition and activating liquid in separate containers. For example, the polymeric composition might be formed into a flexible sheet. Said sheet if desired could have a reflective backing (e.g., aluminum foil) and, if desired, a protective flexible backing. Said sheet might be of any size and if desired rolled like a rug for storage. Said sheet could then be activated by spraying the activating liquid from any conventional spray device so as to fully contact the sheet.

The wavelength of the light emitted by the composition of this invention will vary, depending upon the particular fluorescent component employed in the reaction.

Although in the process of obtaining chemiluminescent light according to this invention, it is normally not necessary to employ a specific order or sequence of steps in the adding of the individual ingredients of the inventive chemiluminescent composition, it has been found that the fluorescent component preferably should be already in the reaction mixture at the time of addition of the last component necessary to bring about the chemical reaction and the concurrent release of chemical energy.

Additionally, it has been found that the superior intensity of chemiluminescence is obtained when the final mixture producing the luminescence is maintained at a temperature of between about −40°C. and 75°C., preferably between about 20°C. and 50°C.; however, the luminescence of Applicants' process is not limited to these ranges. However, the temperature is not critical.

Additionally, the composition and the process which obtain preferred optimum chemiluminescent light intensity employ a base in an amount sufficient to produce a basic pH. However, the preferred extended lifetime is obtained under about neutral conditions. Any suitable base which does not interfere with the chemiluminescent composition and process of this invention may be employed.

A wide variety of organic and inorganic bases is contemplated, typical bases being: sodium hydroxide, potassium hydroxide, potassium tertiary butoxide, sodium ethoxide, sodium methoxide, ammonium hydroxide, tetrabutyl ammonium hydroxide, and triphenyl methide; Lewis bases, including pyridine, triethylamine, quinoline, and the like.

The lifetime and the intensity of the chemiluminescent light can be regulated by the use of certain regulators such as:

EXAMPLES I - III

For these Examples a 100-foot length of ½-inch inside diameter, ⅛-inch wall thickness, flexible transparent polyvinyl chloride tubing (TYGON ) was immersed during ten days at ordinary temperatures in a chemiluminescent component comprising a solution of 0.04M bis(2,4,6-trichlorophenyl)oxalate (TCPO) and 0.003M 9,10-bis(phenylethynyl)anthracene (BPEA) in ethyl benzoate. During this treatment the tube expanded to about twice its original diameter, indicating that the plastic absorbed an appreciable volume of the chemiluminescent component. Excess liquid was removed from the surface of the treated tube leaving it with an essentially dry appearance. Sections of the treated tubing were employed in the Examples below.

EXAMPLE I

A 6-inch length of treated tubing was immersed for one minute in a peroxide component comprising a solution of 0.3M hydrogen peroxide and 0.006M sodium salicylate in 3,6-dimethyl-3-octanol. The tubing immediately began to emit a bright yellowgreen light, which continued for about 20 minutes after the tube was removed from the peroxide solution. The surface of the tube may be blotted or rinsed with acetone and blotted without appreciably affecting the quality of light emission. After a period of time when the light became dim, light emission was reactivated by a second brief immersion of the tube in the peroxide component. This reactivation process may be repeated as many times as required.

EXAMPLE II

A 10-foot length of treated tubing was sliced and cut up into approximately ½ to one square inch squares or rectangles. The pieces were immersed for two minutes in a solution of 0.9M hydrogen peroxide in a mixture of 50 percent dimethyl phthalate and 50 percent 3-methyl-3-pentanol. The luminescent pieces were then used as markers which continued to emit light for up to 4 hours.

EXAMPLE III

A 10-foot length of tubing was attached to a conventional aerosol spray can charged with a conventional freon propellent and the peroxide component described in Example I. The can was discharged into the tube and the tube became luminescent. The liquid served only as a carrier for the hydrogen peroxide and catalyst so as to distribute these reactants over a large surface on the inner face of the tube. Thus the volume of liquid is small and the tube remains essentially empty. Instead of the peroxide component described in Example I, hydrogen peroxide alone in any carrier solvent such as ethyl acetate, diethyl ether, dimethyl phthalate, and/or dibutyl phthalate may be used. In the absence of a catalyst such as sodium salicylate the light is less intense but longer lived. Alternatively a propellent container-dispenser, equipped with an Aspirator tube such as the Pre-Val , manufactured by Precision Valve Corporation, may be inserted into a container of pure hydrogen peroxide or 90 percent aqueous hydrogen peroxide, or 50 percent aqueous hydrogen peroxide, or a solution of hydrogen peroxide in a carrier solvent and the hydrogen peroxide can be injected into the tube to provide luminescence. This arrangement avoids the necessity of storing hydrogen peroxide in contact with the aerosol propellent. Alternatively the peroxide components of Example I may be pumped into the tube so as to partly or completely fill it, wherein light is emitted from the part of the tube in contact with the peroxide component.

EXAMPLES IV – VI

The conditions of Examples I–III were repeated using as the chemiluminescent compound 0.1M bis(2,4,5-trichloro-6-carbobutoxyphenyl) oxylate, in dibutyl phthalate (replacing ethyl benzoate as the solvent). The results were substantially the same.

EXAMPLE VII

A paste comprising 5 g. of a solution of 0.04M bis(2,4,6-trichlorophenyl)oxalate (TCPO) and 0.004M bis(phenylethynyl)anthracene (BPEA) in ethylbenzoate and 5 g. of poly(vinyl chloride) resin powder was spread on a glass surface and placed in an oven at 120°C. for 7 to 10 minutes to yield on cooling a flexible elastic film. The film produced bright yellow-green chemiluminescent light when placed in solutions of 0.03M $H_2O_2$ and 0.006M sodium salicylate in various solvents. For equal immersion times in peroxide solution, the brightness of the light depends on the peroxide solvent in the following order: triethylphosphate > dimethyloctanol > tertiarybutanol.

EXAMPLE VIII

Dissolving 4 g. of poly(methyl methacrylate) in 6 g. of a solution of 0.04M TCPO and 0.004M BPEA in ethylbenzoate produced a viscous solution which air dried to a brittle film when cast on a glass plate. This film gave a bright yellowgreen chemiluminescence when immersed in a solution of 0.3M H O and 0.006M sodium salicylate in acetone.

EXAMPLE IX

One kilogram of polyethylene flock was treated with 5 liters of a solution of 0.06M TCPO and 0.003M BPEA in benzene. The mixture was well mixed in a blender and dried in a rotating oven under reduced pressure at 40° – 60°C. Similar powders were prepared using polypropylene flock or polyacrylonitrile (CRESLAN ) flock. Each of the powders were distributed over the surfaces of heated 1-mil aluminum foil 2-mil polyethylene laminates so as to imbed in the soft polyethylene and adhere to it.

EXAMPLE X

A pressure sensitive tape was prepared by blending 100 parts of polyisobutylene (VISTANEX MN L-100), 25 parts of VISTANEX LM-MH and 125 parts of an alkylated phenol resin with a solution of 0.06M TCPO and 0.003M BPEA in 3/0 ml. of benzene and coating the resulting mixture onto a translucent polyethylene strip. The tape was used in a roll-type dispenser equipped with a felt wick, so that the tape brushes over the wick and is wet as the tape is dispensed. The wick dips into a container of 0.9M hydrogen peroxide in 3,5-dimethyl-3-octanol. Thus the tape is activated and becomes luminescent as it is dispensed. The tape can be applied to objects to establish selfluminescent markers. Since the luminescent substrate is on the underside of the polyethylene strip, it is protected from adverse environmental factors such as heavy rain or salt water spray.

EXAMPLE XI

An essentially homogeneous mixture of 50 parts poly(vinyl chloride), 50 parts dioctyl phthalate, 4 parts TCPO and 1 part BPEA was prepared using a conventional polymer blender or a Waring blender. The mixture was extruded using conventional equipment into a film of 20-mil thickness (a wide range of film thicknesses can be obtained as desired). The resulting film was laminated by hot rolling to 0.5 mil aluminum foil. The film can be activated with a variety of hydroperoxide reactants.

It is obvious that many substitutions may be made for the specific ingredients used in the above examples. Thus poly(vinyl chloride) tubing may be replaced with any transparent plastic tubing capable of absorbing the oxalate component such as poly(methyl methacrylate), polystyrene and ABS. Ethyl benzoate may be replaced by dimethyl phthalate, dibutyl phthalate, benzene, dichlorobenzene, etc., providing the solvent is absorbable into the plastic tubing and providing the solvent dissolves the oxalate. TCPO may be replaced with a number of oxalate esters and anhydrides. The solvent for the peroxide component may be any tertiary alcohol, (preferred for basecontaining components) or an ester solvent such as dibutyl phthalate, ethyl benzoate, butyl benzoate, triacetin, or other solvents capable of dissolving hydrogen peroxide and maintaining satisfactory hydrogen peroxide concentrations during storage. Many suitable alternatives are disclosed in copending application Ser. No. 813,973.

The invention provides systems and devices for providing visible light whenever and wherever desired, independent of conventional electrical lighting methods and without the hazards of electrical lighting. The chemiluminescent lighting systems can be especially useful in emergency situations where all other forms of lighting have failed. The systems do not have the fire hazard of ignitable lighting devices such as candles, gas, or oil lights.

It will be readily apparent that the chemiluminescent systems are not confined to emergency lighting, however. They can be used at any time where a cold, safe illuminating means is desired. They are also useful to provide illumination where electrical illumination is unavailable. Such systems can also be made highly portable. Moreover, the applications and useful devices are varied and numerous in view of the possibility of using configured display means and the ability of the chemiluminescent substrate to take such configured forms.

We claim:

1. A composition intended to be used for producing chemiluminescent light, said composition having an organic solvent swellable polymeric compound having incorporated therewith a chemiluminescent compound, said chemiluminescent compound being inert to oxygen and thereby capable of exposure to the atmosphere without effect, said composition being adapted to be reacted with a hydroperoxide in the presence and an organic solvent and an organic fluorescent compound whereby chemiluminescent light is produced, the ratio of said chemiluminescent compound, fluorescent compound, solvent and hydroperoxide being such as to obtain visible chemiluminescent light.

2. The composition of claim 1 wherein the chemiluminescent compound is itself fluorescent and takes the place of said organic fluorescent compound.

3. The composition of claim 1 wherein the polymeric compound is polyvinyl chloride.

4. The composition of claim 2 wherein said chemiluminescent compound is a bis-aryl oxalate ester derived from a phenol having an ionization constant more positive than $1.3 \times 10^{-10}$.

5. The composition of claim 4 wherein said chemiluminescent compound is selected from the group comprising bis (2,4,6-trichlorophenyl)oxalate, bis (2,4,5-trichloro-6-carbobutoxyphenyl)oxalate, and bis (2,4,5-trichloro-6-carbopentoxyphenyl)oxalate.

6. The composition of claim 1 wherein said fluorescer is 9,10-bis(phenylethynyl) anthracene.

7. The composition of claim 1 wherein said polymeric compound is in the form of a shaped solid.

* * * * *